United States Patent [19]
Moyal

[11] Patent Number: 5,422,832
[45] Date of Patent: Jun. 6, 1995

[54] VARIABLE THERMAL SENSOR

[75] Inventor: Miki Moyal, Austin, Tex.

[73] Assignee: Advanced Micro Devices, Sunnyvale, Calif.

[21] Appl. No.: 172,038

[22] Filed: Dec. 22, 1993

[51] Int. Cl.[6] ............................ G01K 7/01; G01K 7/00
[52] U.S. Cl. ..................... 364/557; 323/107; 361/103; 361/106; 330/289; 327/512
[58] Field of Search ............... 364/557; 323/907, 313, 323/315; 307/310, 296.1, 296.6; 361/103, 106; 330/289; 374/178

[56] References Cited

U.S. PATENT DOCUMENTS

| | | | |
|---|---|---|---|
| 4,779,161 | 10/1988 | Deshazo, Jr. ..................... | 361/106 |
| 4,924,112 | 5/1990 | Anderson et al. .................. | 307/270 |
| 5,287,292 | 2/1994 | Kenny et al. ....................... | 364/550 |
| 5,291,607 | 3/1994 | Ristic et al. ........................ | 395/750 |

OTHER PUBLICATIONS

*Solid State Electronic Devices*, Ben G. Streetman, 1980, Chapter 5 and pp. 344–351.
*The Temperature Handbook*, Omega Engineering, 1990, Chapter P.

Primary Examiner—Emanuel T. Voeltz
Assistant Examiner—Patrick J. Assouad
Attorney, Agent, or Firm—Foley & Lardner

[57] ABSTRACT

A thermal sensor for use in integrated circuits includes a plurality of MOSFET diodes. The thermal sensor senses temperature within the integrated circuit and provides a control signal. The control signal may be utilized to control thermal management devices such as fans, clock dividers, or other thermal management devices. The thermal sensor is preferably integrated within the microprocessor adjacent clock driver circuitry. The thermal sensor generally includes current mirrors coupled to diodes. The diodes control the output of the current mirrors so that larger current is drawn from the current mirrors when the temperature is higher in the integrated circuit. The current mirrors supply current to a constant signal source and an impedance circuit. The control circuit compares the voltages from the impedance circuit and the constant signal source. The control circuit provides the control signal when the signal from the impedance circuit is above a predetermined threshold.

28 Claims, 8 Drawing Sheets

VARIABLE THERMAL SENSOR

BACKGROUND OF THE INVENTION

The present invention relates to thermal sensing devices. More particularly, the present invention relates to thermal sensing devices for use with an integrated circuit such as a microprocessor.

Integrated circuits (ICs) generate heat when powered by an electric source such as a power supply. ICs are generally susceptible to overheating which may cause the IC or the device in which the IC is employed to fail, to malfunction, to be uncomfortable for the user to handle, or otherwise diminish the utility of the IC or the device. Particularly, the overheating of ICs is becoming a more serious problem as more powerful and more complex ICs are packaged in smaller and lighter IC packages. For example, powerful microprocessors which are utilized in compact laptop computers and notebook computers, often heat the laptop computer or notebook computer until the laptop computer or notebook computer is uncomfortable to hold. Further, the use of lighter, less expensive, and highly insulative plastic IC packages compounds the overheating problems.

Thus, thermal management of ICs is necessary to prevent the IC and the device in which the IC is employed from overheating. A variety of thermal management devices and techniques have been employed to attempt to prevent ICs from overheating. For example, some ICs are encapsulated in packages that have a fan mounted on the package. The fan forces air onto the package in order to cool the IC. These fans are generally constantly turned ON and consuming power. These fans are disadvantageous because they require space, power and are expensive.

Other thermal management approaches attempt to limit the amount of time that the thermal management device is employed. For example, one approach counts the number of clock cycles supplied to or used by the IC and assumes that the IC is overheated after a particular number of clock cycles. A thermal management device such as a fan, or a thermal management technique or routine such as decreasing the frequency of clock signals is employed after the particular number of clock cycles has elapsed. Counting the number of clock cycles is disadvantageous because the ambient conditions are not considered. Therefore, the thermal management device or technique may be inefficiently utilized when the IC is not overheating or not utilized at all when the IC is overheating. Also, counting the number of clock cycles requires significant additional hardware.

It would therefore be advantageous to have a thermal sensor which could directly sense temperature within or on the outside of the IC. Further, a thermal sensor could advantageously provide a control signal for use by a thermal management device or routine when the temperature within the IC is above a threshold. Thus, a thermal sensor could advantageously employ thermal management devices or techniques only when the temperature within the IC is in fact too high.

SUMMARY OF THE INVENTION

The present invention provides an apparatus for providing a detect signal related to temperature in a microprocessor. The microprocessor has a clock driver circuitry at a locus. The apparatus includes a semiconductor device and a control circuit. The semiconductor device produces an output signal related to the temperature at the locus. The semi-conductor device is coupled within the microprocessor proximate the locus. The control circuit has a control input which is operatively coupled with the semi-conductor device to receive the output signal. The control circuit generates the detect signal in response to the output signal. The detect signal is generated when the output is in a predetermined relationship with a threshold.

The present invention also provides an apparatus for providing an indicator signal in response to temperature at a locus in an integrated circuit. The apparatus includes threshold means, thermal sensing means, and indicator means. The threshold means provides a threshold signal. The thermal sensing means generates a temperature signal related to the temperature. The thermal sensing means includes a plurality of temperature sensor sensitive devices coupled to generate a thermal signal. The thermal sensing devices include like parameters. The thermal signal is related to the temperature and a factor. The factor is related to a ratio of the like parameters. The temperature sensitive devices are in thermal communication with the locus. The thermal sensing means generate the temperature signal in response to the thermal signal. The indicator means provides the indicator signal. The indicator means has a first indicator input and a second indicator input. The first indicator input is coupled with the thermal sensing means to receive the temperature signal. The second indicator input is coupled with the threshold means to receive the threshold signal. The indicator means provides the indicator signal when the temperature signal is in a predetermined relationship with the threshold signal.

The present invention also provides an apparatus for providing a control signal in response to temperature. The apparatus includes a current source means, a current source control means, a control means, a first impedance means and a second impedance means. The current source means provides a current source signal. The current source control means controls the current source means. The current source control means is coupled with the current source means. The current source control means is responsive to temperature. The current source means cooperates with the current source control means to generate the current source signal. The current source signal is related to the temperature. The control means provides the control signal. The control means receives a first input and a second input. The control means provides the control signal when the second input is in a predetermined relationship with the first input. The first impedance means provides the first input. The first impedance means is coupled with the current source means. The first impedance means receives the current source signal and generates the first input in response to the current source signal. The second impedance means provides the second input. The second impedance means is coupled with the current source means. The second impedance means receives the current source signal and generates the second signal in response to the current source signal. The second input is relatively constant with respect to changes in the current source signal.

The present invention also provides an apparatus for generating control signal in response to temperature. The apparatus includes a first current mirror having a first control input and a first output, a second current mirror having a second control input and a second output, a third current mirror having a third control input and a third output. The first control input is coupled to the second control input and the third control input. The third output provides a current signal. The apparatus also includes a first diode coupled with the first output, a second diode coupled with the second output, an impedance device, and a control circuit. The impedance device is coupled with the third output. The impedance device generates a temperature signal in response to the current signal. The control circuit has a first input coupled with the impedance device. The control signal circuit receives the temperature signal and provides the control signal when the temperature signal is in a predetermined relationship with a predetermined threshold.

It is an object of the present invention to provide a thermal sensor integrated within an integrated circuit such as a microprocessor to provide direct sensing of the temperature within an IC.

It is another object of the present invention to integrate the thermal sensor next to the clock driver of the microprocessor in order to provide a superior thermal sensing operation.

It is a further object of the present invention to provide a thermal sensor comprising minimal hardware components.

It is yet another object of the invention to provide a MOS thermal sensing device which is less susceptible to fabrication variances.

Further objects and features of the present invention will be apparent from the following specification and claims when considered in connection with the accompanying drawings illustrating the preferred exemplary embodiment of the present invention.

BRIEF DESCRIPTION OF THE DRAWINGS

The invention will hereafter be described with reference to the accompanying drawings, wherein like reference numerals denote like elements in the various drawings, and.

DETAILED DESCRIPTION OF THE PREFERRED EXEMPLARY EMBODIMENT

Figure 1:
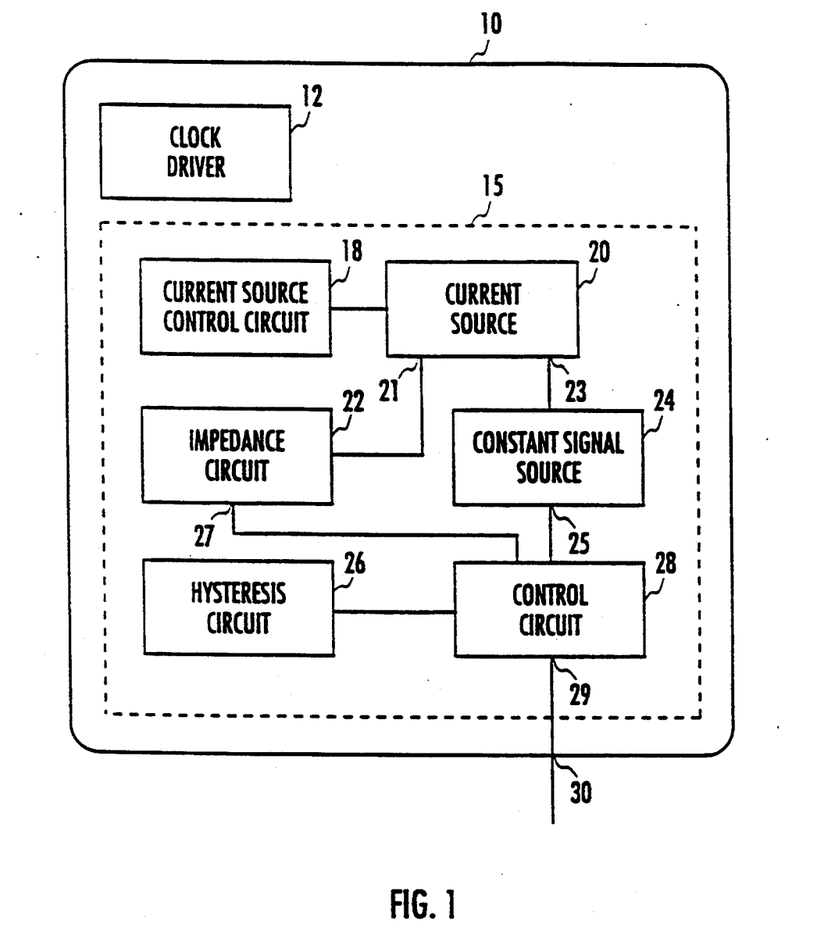
FIG. 1 is a general schematic block diagram of a microprocessor including an exemplary preferred embodiment of the present invention.

FIG. 1 is a general schematic block diagram of a microprocessor including an exemplary embodiment of the present invention. In FIG. 1, an IC such as a microprocessor 10 includes a clock driver circuit 12 and a thermal sensor or apparatus 15. Clock driver circuit 12 preferably drives clock signals for various portions of microprocessor 10. Current associated with clock driver circuit 12 generates heat so that the locus of clock driver circuit 12 is generally the hottest portion or spot in microprocessor 10. Apparatus 15 is preferably integrated adjacent the locus of clock driver circuit 12. Apparatus 15 may be located anywhere within microprocessor 10 or external to microprocessor 10. Preferably, apparatus 15 is a circuit integrated with or coupled within microprocessor 10. Apparatus 15 is preferably in thermal communication with the locus of clock driver circuit 12.

Apparatus 15 advantageously provides direct sensing of temperature associated with microprocessor 10. Apparatus 15 preferably provides a control signal at a control circuit output 29 in response to temperature. The control signal, indicator signal, or detect signal is provided to a thermal management device (not shown) or thermal management circuit (not shown), which operates to lower the temperature associated with microprocessor 10. For example, the thermal management device (not shown) may be a clock divider circuit, a fan, a shutdown circuit, a thermal management subroutine or other technique, circuit or device for cooling microprocessor 10. The control signal at control circuit output 29 may be provided to a pin 30 of microprocessor 10. The control signal may be an analog signal, a multi-bit digital signal, or single bit digital signal.

Apparatus 15 includes a current source control circuit 18, a current source 20, an impedance circuit 22, a constant signal control source 24, a hysteresis circuit 26, and a control circuit 28. Current source control circuit 18 is coupled to current source 20. Impedance circuit 22 and constant signal source 24 are coupled to current source 20. Control circuit 28 is coupled to impedance circuit 22 and constant signal source 24. Hysteresis circuit 26 is coupled to control circuit 28. Control circuit output 29 is coupled to pin 30.

Apparatus 15 preferably provides a semiconductor device for sensing the temperature in microprocessor 10. Apparatus 15 preferably includes circuitry such as current source control circuit 18, current source 20, and impedance circuit 22 which generates a temperature signal indicative of the temperature within microprocessor 10. Preferably, control circuit 28 receives the temperature signal and generates a control signal when the temperature signal exceeds a predetermined threshold.

Thus, control circuit 28 provides an indicator circuit which provides the control signal when the temperature signal exceeds a predetermined threshold. Preferably, the apparatus 15 includes thermal sensing devices such as diodes (not shown in FIG. 1) located in current source control circuit 18 which are arranged to reduce inaccuracies due to processing variations. The thermal sensing devices preferably generate a thermal signal which is related to the temperature signal. The thermal sensing devices are generally thermally coupled to microprocessor 10 or located close enough to or within microprocessor 10 so that the thermal sensing devices are in thermal communication with microprocessor 10. Preferably, apparatus 15 includes hysteresis circuit 26 which prevents ON/OFF cycling of the control signal at control signal output 29.

Current source control circuit 18 includes thermal sensing devices or temperature sensitive devices which control the amount of current provided by current source 20 at a current source output 21 and a current source output 23. Preferably, the amount of current provided at outputs 21 and 23 is related to the temperature in microprocessor 10. Impedance circuit 22 provides a temperature signal related to the current provided at current source output 21, and constant signal source 24 provides a signal at a constant signal source output 25 in response to the current at current source output 23.

Impedance circuit 22 preferably provides a temperature signal proportionally related to the temperature in the microprocessor 10 at an impedance circuit output 27 in response to the current at current source output 21. Preferably, the signal at constant signal source output 25 is a constant signal representative of a threshold temperature. The signal at constant signal source output 25 is preferably constant with respect to changes in temperature.

Control circuit 28 preferably compares the signal at constant signal source output 25 to the signal at impedance circuit output 27. When the signal at impedance circuit output 27 is greater than the signal at constant signal source output 25, control circuit 28 provides the control signal at control circuit output 29. Hysteresis circuit 26 provides hysteresis to control circuit 28 in order to reduce ON/OFF exercising of the control signal. Hysteresis circuit 26 preferably increases the temperature signal at impedance circuit output 27 when the threshold temperature has been exceeded.

Figure 2:
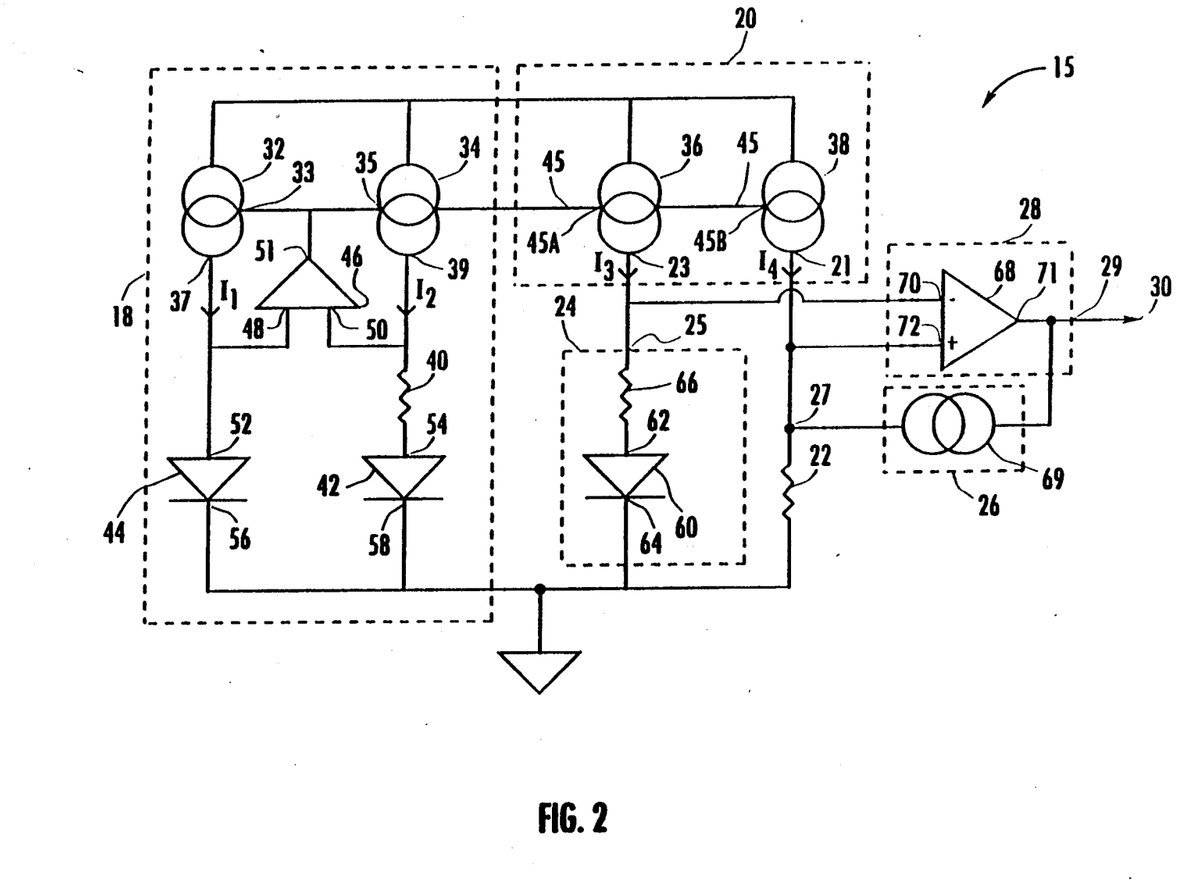
FIG. 2 is a more detailed schematic block diagram of the preferred embodiment of the present invention.

FIG. 2 is a more detailed schematic block diagram of the preferred exemplary embodiment of the present invention. In FIG. 2, apparatus 15 includes current source control circuit 18, current source 20, constant signal source 24, impedance circuit 22, control circuit 28, and hysteresis circuit 26. Current source control circuit 18 includes a current source or current generator 32, a current source or current generator 34, a resistor 40, a diode 42, a diode 44, and an amplifier 46. Amplifier 46 is preferably a high gain operational amplifier.

Current source 20 includes a current generator 36 and a current generator 38. Current generators 32, 34, 36 and 38 are powered from VCC. Current generator 32 and current generator 34 are coupled together to form a current mirror. Current generators 36 and 38 are also coupled together to form a current mirror. Each of current generators 36 and 38 are also in a current mirror relationship with each of current generators 32 and 34.

A control input 33 of current generator 32 is coupled to a control input 35 of current generator 34 and an output 51 of amplifier 46. A current generator output 37 of current generator 32 is coupled to an anode 52 of diode 44. A cathode 56 of diode 44 is coupled to a cathode 58 of diode 42 and ground. An anode 54 of diode 42 is coupled to a current generator output 39 of current generator 34 through resistor 40. Current generator output 39 is coupled to an input 50 of amplifier 46, and current generator output 37 is coupled to an input 48 of amplifier 46.

Current source 20 includes current generator 36 and current generator 38. A control input 45A of current generator 36 and a control input 45B of current generator 38 are coupled to current control line 45. Current control line 45 is preferably a conductor coupling control inputs 33, 35, 45A and 45B together. Current control line 45 provides a signal to current generators 36 and 38 so that the current at current source output 21 of current generator 38 and current source output 23 of current generator 36 are each equal to the current from current generator output 37 ($I_1$).

Thus, the level of current from current generator output 37 ($I_1$) is equal to each of the following: the level of current from current generator output 39 ($I_2$), the level of current from current source output 21 ($I_4$), the level of current from current source output 23 ($I_3$). The level of current $I_1$ is equal to each of the levels from current generator output 39, current source output 21, and current source output 23 due to the current mirror relationship discussed above. Further, the current $I_1$ is equal to the current through diode 44 because input 48 is a high impedance input, and the current $I_2$ is equal to the current through resistor 40 because input 50 is a high impedance input.

Constant signal source 24 includes a resistor 66 and a diode 60. An anode 62 of diode 60 is coupled to current source output 23 through resistor 66. A cathode 64 of diode 60 is coupled to ground.

Control circuit 28 includes a comparator 68. Comparator 68 includes a non-inverting input 72, an inverting input 70 and a comparator output 71. Comparator output 71 is coupled to control circuit output 29, which is coupled to pin 30. Non-inverting input 72 and inverting input 70 are high impedance inputs. Therefore, the current $I_3$ is equal to the current in resistor 66, and the current $I_4$ is equal to the current through impedance circuit 22.

Hysteresis circuit 26 includes a current generator or a current source 69. Comparator output 71 is coupled to impedance circuit 22 through current source 69. Non-inverting input 72 is coupled to impedance circuit 22 at impedance circuit output 27 and is also coupled with current source output 21. Inverting input 70 is coupled to current source output 23 and constant signal source output 25. The operation of apparatus 15 is described in more detail with respect to FIG. 2 as follows.

Diodes 42 and 44 are thermal sensing devices which have a voltage drop which is proportional to temperature. Preferably, the voltage drop across each of diodes 42 and 44 increases with respect to temperature. Preferably, the voltage across each of diodes 42 and 44 is represented by the following equation:

$$V = \frac{KT}{Q} \ln\left(\frac{I}{I_s}\right) \qquad (1)$$

where V is the voltage across the specific diode, K is Boltzmann's constant, Q represents electric charge, T is temperature, I is the current through the specific diode, and $I_s$ is the saturation current for the specific diode. The current through either diode 42 or 44 is equal to the current $I_1$ from current generator output 37 as discussed above. Thus, the current I in equation (1) is equal to $I_1$, $I_2$, $I_3$, or $I_4$.

Preferably, diodes 42 and 44 are arranged to eliminate process variations associated with the saturation current ($I_s$ of Equation (1)) as discussed below with reference to Equations (2) and (3). Saturation current ($I_s$) is represented by the following equation:

$$I_s = kA \qquad (2)$$

where k is a constant and A is the area of the specific diode. Thus, saturation current $I_s$ is generally a constant for the specific diode which is proportional to the area of the specific diode. Process variances such as slight differences in areas may affect the accuracy of the temperature sensing operation of diodes 42 and 44.

As stated above, current generators 32, 34, 36 and 38 are preferably controlled so that the current at current generator output 37 ($I_1$), current generator output 39 ($I_2$), current source output 21 ($I_4$), and current source output 23 ($I_3$) are all equal. The difference between the voltage at input 50 and input 48 of amplifier 46 is represented by the following equation determined by Kirchoff's first rule:

$$V_{diff} = V_{44} - I_1 R_{40} - V_{42} \qquad (3)$$

where $V_{diff}$ is the voltage between inputs 48 and 50; $V_{44}$ is the voltage across diode 44; $V_{42}$ is the voltage across diode 42; $I_1$ is the current through diode 44 which is equal to the current through resistor 40; and $R_{40}$ is the resistance value of resistor 40.

Amplifier 46 ensures that $V_{diff}$ is equal to zero. Amplifier 46 is configured as a closed loop amplifier and drives a signal at amplifier output 51, which is coupled to control input 33 of current generator 32 and control input 35 of current generator 34 so that the voltage at input 48 is equal to the voltage at input 50. Hence, amplifier 46 acts as an insurance circuit which ensures that the difference in the voltage at input 48 and 50 is zero as described in more detail below with respect to Equation (6).

Therefore, from Equation (2), since $V_{diff}$ is 0, the current $I_1$, as well as the current from current generator output 39 ($I_2$), current source output 21 ($I_3$), and current source output 23 ($I_4$), is represented by the following equation:

$$I_1 = I_2 = I_3 = I_4 = \frac{V_{44} - V_{42}}{R_{40}} \qquad (4)$$

From Equations (1), (2) and (4):

$$I_1 = I_2 = I_3 = I_4 = \frac{KT}{QR_{40}} \ln\left(\frac{I}{kA_1}\right) - \frac{KT}{QR_{40}} \ln\left(\frac{I}{kA_2}\right) \qquad (5)$$

$$I_1 = I_2 = I_3 = I_4 = \frac{KT}{QR_{40}} \left[\ln\left(\frac{I}{kA_1}\right) - \ln\left(\frac{I}{kA_2}\right)\right]$$

$$I_1 = I_2 = I_3 = I_4 = \frac{KT}{QR_{40}} \left[\ln \frac{\left(\frac{I}{kA_1}\right)}{\left(\frac{I}{kA_2}\right)}\right]$$

$$I_1 = I_2 = I_3 = I_4 = \frac{KT}{QR_{40}} \ln\left(\frac{IkA_2}{IkA_1}\right)$$

Thus, from well known logarithmic principles, Equation (5) can be more simply expressed as the following equation:

$$I_1 = I_2 = I_3 = I_4 = \frac{KT}{QR_{40}} \ln\left(\frac{A_2}{A_1}\right) \qquad (6)$$

where $A_2$ is the area associated with diode 44; and $A_1$ is the area associated with diode 42. Equation (6) may be represented as:

$$I_1 = I_2 = I_3 = I_4 = \propto T \qquad (7)$$

where $\propto$ is a constant representing:

$$\frac{K}{QR_{40}} \ln \frac{A_2}{A_1} \qquad (8)$$

Therefore, the current $I_1$ is equal to the temperature in microprocessor 10 times a constant or factor, $\propto$. The constant or factor, $\propto$, is related to the ratio of the areas of diodes 42 and 44. The process variations associated with $I_s$ in Equation (1) are reduced by the arrangement of diodes 42 and 44. The arrangement of diodes 42 and 44 reduces inaccuracies because any inaccuracies due to process variations in area, $A_1$ or $A_2$, are reduced by $A_2$ being divided by $A_1$, that is, the ratio of $A_2$ to $A_1$. The current $I_1$ as well as currents $I_2$, $I_3$, $I_4$ are proportional to temperature and a constant $\propto$, which is less susceptible to inaccuracies due to process variations. Therefore, diodes 42 and 44 cooperate so that the current $I_1$ at current generator output 37 and the current $I_2$ at current generator output 39 is proportional to the temperature in microprocessor 10 and the ratio of a parameter such as area of diodes 42 and 44.

Amplifier 46, acting as an insurance circuit, drives currents $I_1$ and $I_2$ so that currents $I_1$ and $I_2$ more accurately relate to temperature and are less susceptible to process variations due to the factor $V_{diff}$ (Equation (3)). Since amplifier 46 ensures that $V_{diff}$ is zero, any inaccuracies in the temperature sensing operation are essentially only due to process variations related to $I_s$ (Equation (1)), that is, the ratio of $A_2$ and $A_1$ (Equation (6)). Therefore, amplifier 46 acts as an insurance circuit which further reduces inaccuracies in the temperature sensing operation (Equation 6).

Preferably, current source control circuit 18 and current source 20 cooperate so that current source 20 provides currents $I_3$ and $I_4$. The temperature signal is generated by impedance circuit 22, which is preferably a resistor, capacitor, transistor, or other impedance device. The temperature signal is generated in response to current from current source output 21 (current $I_4$). The current $I_4$ is proportional to the temperature in microprocessor 10 as discussed above with reference to Equation (6). Therefore, the voltage provided at non-inverting input 72 of comparator 68 is proportional to temperature in microprocessor 10.

Current $I_3$ is provided to constant signal source 24. Constant signal source 24 is configured so that the voltage across diode 60 decreases with increases in temperature and the voltage across resistor 66 increases with increases in temperature. The voltage across resistor 66 increases with temperature because the current $I_3$ from current source output 23 increases with temperature (Equation (6)). Resistor 66 is preferably a variable resistor which may be programmed to selected resistance values. Therefore, the voltage across resistor 66 may be programmed to have the opposite or inverse response to temperature of diode 60. For example, if the voltage drop across diode 60 in response to the current $I_3$ from current source output 23 decreases 2 mV per degree Celsius, the resistance across resistor 66 should be adjusted so that the voltage across resistor 66 in response to the current from current source output 23 increases 2 mV per degree Celsius. Thus, resistor 66 and diode 60 cooperate to provide a constant signal at inverting input 70.

Comparator 68 of control circuit 28 receives the temperature signal (the voltage at impedance circuit output 27) at non-inverting input 72 and the voltage at constant current source output 25 at inverting input 70 and provides a logic LOW at comparator output 71 when the voltage at impedance circuit output 27 is less than the voltage at constant signal source output 25. When the voltage at impedance source output 27 is greater than the voltage at constant signal source output 25, comparator 68 provides a logic HIGH at comparator output 71. Thus, when the output at comparator output 71 is a logic HIGH, the temperature within microprocessor 10 (represented by the temperature signal) has exceeded a predetermined threshold (represented by the voltage at constant signal source output 25). Alternatively, control circuit 28 could provide an analog signal at control circuit output 29. Also, control circuit 28 could include an analog-to-digital converter (not shown) which can provide a multibit signal at control circuit output 29. Also, control circuit 28 could include several comparators (not shown), each providing a control signal at a different threshold in order to provide a multibit signal at control circuit output 29.

Hysteresis circuit 26 operates to provide hysteresis to control circuit 28. When the control signal is provided as a logic HIGH at comparator output 71, current source 69 provides extra current to impedance circuit 22. When impedance circuit 22 receives extra current from current source 69, and the voltage level at impedance circuit output 27 is raised. When the temperature in microprocessor 10 falls, the voltage at impedance circuit output 27 falls below the voltage at constant signal source output 25, and comparator 68 will provide a logic LOW at comparator output 71 and turn OFF current source 69. Therefore, the voltage at impedance circuit output 27 falls even lower when the extra current is not supplied from current source 69. Thus, hysteresis circuit 26 prevents ON/OFF exercising of the control signal provided at comparator output 71 as explained in more detail below with reference to FIG. 5. Preferably, hysteresis circuit 26 is programmable to provide different levels of hysteresis by providing different levels of current in response to the control signal and program inputs (not shown).

Figure 3:
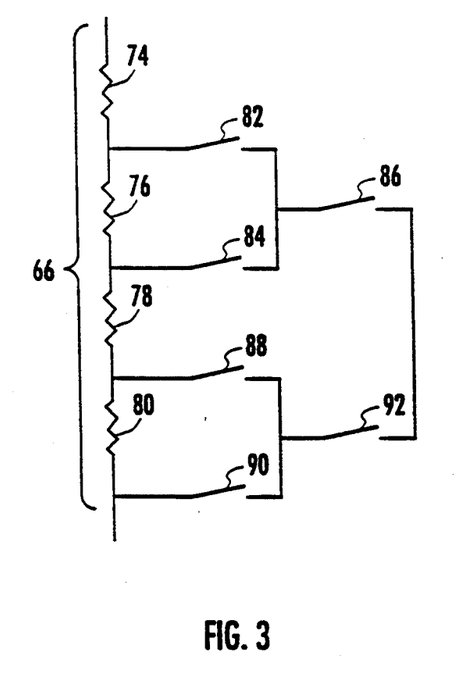
FIG. 3 is a schematic diagram of a resistor for use in the preferred embodiment of the present invention illustrated in FIG. 2.

FIG. 3 is a schematic diagram of a resistor utilized in the constant signal source. Resistor 66 is comprised of a resistor 74, a resistor 76, a resistor 78, a resistor 80, a switch 82, a switch 84, a switch 86, a switch 88, a switch 90, and a switch 92. The resistance value of resistor 66 can be changed as switches 82, 84, 86, 88, 90, and 92 are manipulated to provide various resistive paths across resistor 66. Preferably, switches 82, 84, 86, 88, 90 and 92 are programmable IC switches or fuses. Thus, the resistance value of resistor 66 may be manipulated (as explained in detail above) so that constant signal source 24 provides a constant voltage at constant signal source output 25 with respect to temperature.

Figure 4:
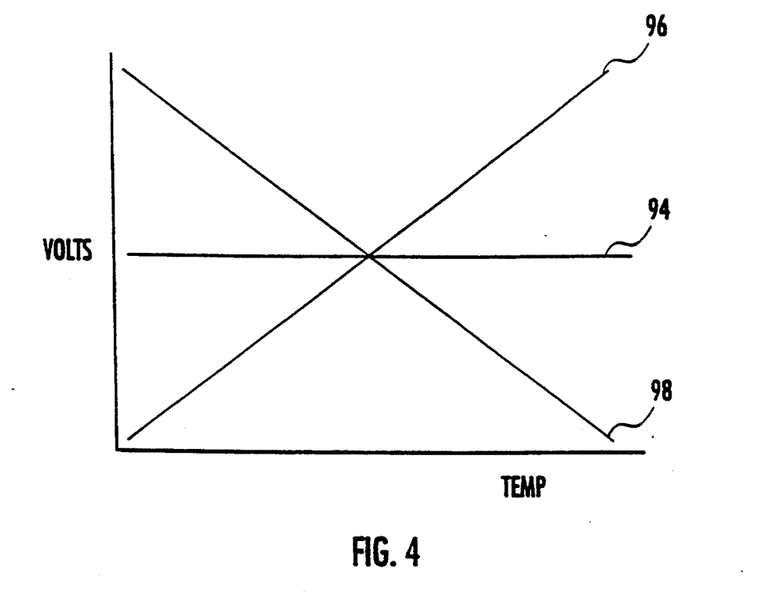
FIG. 4 is a waveform diagram of the voltage across a diode illustrated in FIG. 2 and the voltage across a resistor illustrated in FIG. 2.

With reference to FIG. 4, a waveform diagram of the voltage signal across the resistor and a waveform diagram of the voltage across the diode in the constant signal source 24 is shown. In FIG. 4, the vertical axis represents voltage, and the horizontal axis represents temperature. A waveform 96 represents the voltage across resistor 66 (FIG. (2)), and a waveform 98 represents the voltage across diode 60 (FIG. (2)). Resistor 66 is adjusted so that the slope of waveform 96 is substantially the negative (multiplied by −1) of waveform 98. The sum of waveforms 96 and 98 is therefore a horizontal straight line 94 which is the signal at constant signal source output 25. Therefore, the signal at constant signal source output 25 is horizontal straight line 94 which is a constant signal with respect to temperature. Waveform 96 preferably has a slope of 2 mV/° C., and waveform 98 preferably has a slope of −2 mV/° C.

Figure 5:
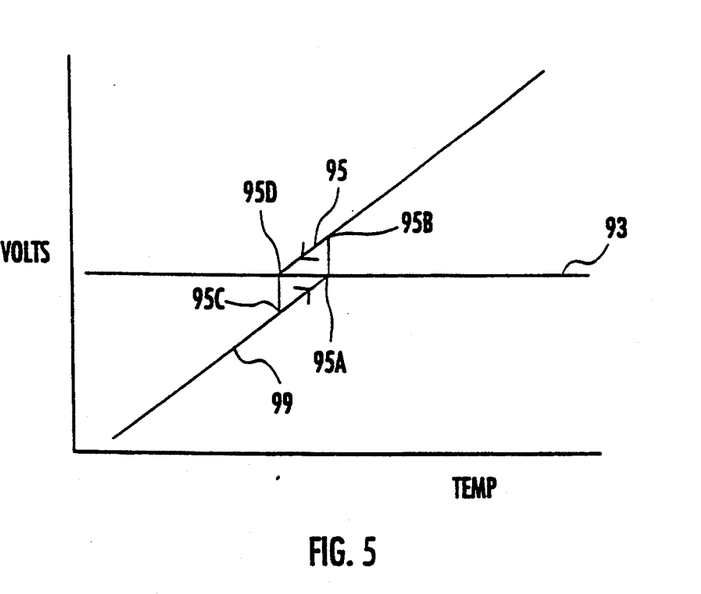
FIG. 5 is a waveform diagram of the voltage at a non-inverting input of the amplifier illustrated in FIG. 2 and the voltage at the inverting input of the amplifier illustrated in FIG. 2.

FIG. 5 is a waveform diagram of the voltage at the constant signal source output and the voltage at the impedance circuit output. In FIG. 5, the vertical axis represents voltage, and the horizontal axis represents temperature. A waveform 93, similar to horizontal straight line 94 (FIG. (4)), represents the voltage of constant signal source output 25 (FIG. (2)), and a waveform 99 represents the voltage at impedance circuit output 27 (FIG. (2)). Waveform 99 preferably has a slope of 2 mV/° C.

The effect of hysteresis circuit 26 on waveform 99 is shown in a hysteresis portion 95 of waveform 99. With reference to FIGS. 2 and 5, the signal at impedance circuit output 27 (waveform 99) approaches the voltage level at constant signal source output 25 (waveform 93) with a relatively constant slope from a point 95C. When the signal at impedance circuit output 27 reaches the voltage level at the constant signal source output 25 at a point 95A, the voltage level at impedance circuit output 27 jumps to a level represented by a point 95B.

The voltage level at the signal source output 27 jumps because current source 69 in hysteresis circuit 26 (FIG. 2) provides extra current to impedance circuit 22 when the voltage at impedance circuit output 27 reaches point 95A. The extra current provided by current source 69 raises the voltage level at impedance circuit output 27 from point 95A to point 95B.

Once the voltage level at impedance circuit output 27 is above the voltage level represented by waveform 93, the voltage level at the impedance circuit output 27 (waveform 99) has a relatively constant slope as it approaches waveform 93 until the voltage level at impedance circuit output 27 reaches a point 95D. As the voltage level at impedance circuit output 27 falls below the voltage level at constant signal source output 25 at point 95D, current source 69 ceases to provide the extra current to impedance circuit 22. The voltage level at impedance circuit output 27 falls to point 95C because current source 69 is no longer providing the extra current. Therefore, the voltage level at impedance circuit output 27 follows a first path along waveform 99 when the voltage level increases from point 95C through point 95A to point 95B, and follows a second path when the voltage level at impedance circuit output 27 decreases from point 95B through point 95D to point 95C. These two separate paths prevent ON/OFF exercising when the voltage level at the temperature signal is near the voltage level represented by waveform 93.

Figure 6:
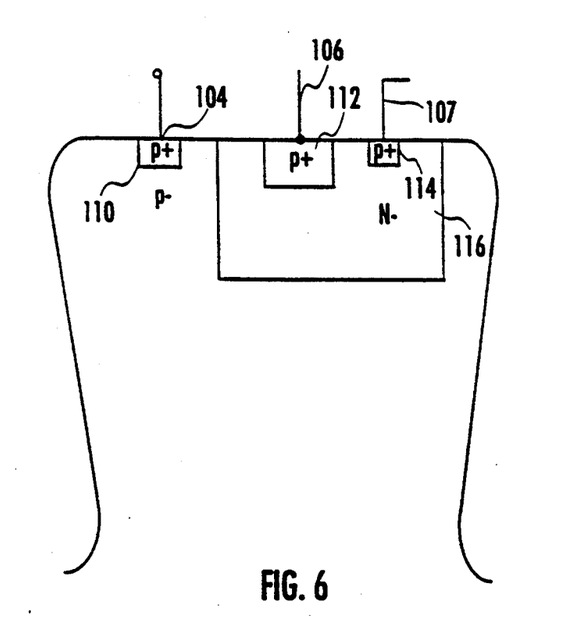
FIG. 6 is a schematic diagram of a CMOS diode for use in the preferred embodiment of the present invention.
Figure 7:
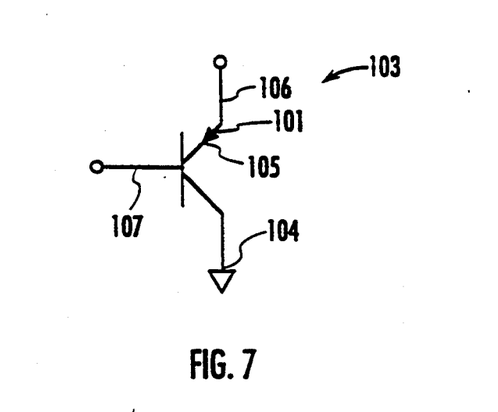
FIG. 7 is a schematic diagram illustrating terminal connections for the CMOS diode illustrated in FIG. 6.

FIG. 6 is a schematic diagram of a CMOS diode for use in the preferred embodiment of the present invention, and FIG. 7 is a schematic diagram illustrating terminal connections for the diode illustrated in FIG. 6. With reference to FIGS. 6 and 7, a preferred exemplary embodiment of a diode such as diodes 42, 44 and 60 is shown. Preferably, a diode 103 is a CMOS diode including a terminal 104, a terminal 106, and a terminal 107. Diode 103 (FIG. 7) includes an anode 101 (similar to anodes 52, 54 and 62 in FIG. 2) and a cathode 105 (similar to cathodes 56, 58 and 64 in FIG. 2). Terminal 104 is preferably a substrate or source terminal coupled with a P+ region 110. Terminal 106 is preferably a drain terminal preferably coupled with a P+ region 112, and terminal 107 is preferably a gate region coupled with a P+ region 114. P+ region 112 is surrounded by an N-well region 116. P+ region 114 is also surrounded by N- well region 116. Preferably, diode 103 has a −2 mV per degree Centigrade temperature constant, a 0.6 V drop from terminal 106 to terminal 107 at 20 microamps of current through terminals 107 and 106. Preferably, the size of diode 103 is 9.6 micrometers by 9.6 micrometers.

Figure 8A:
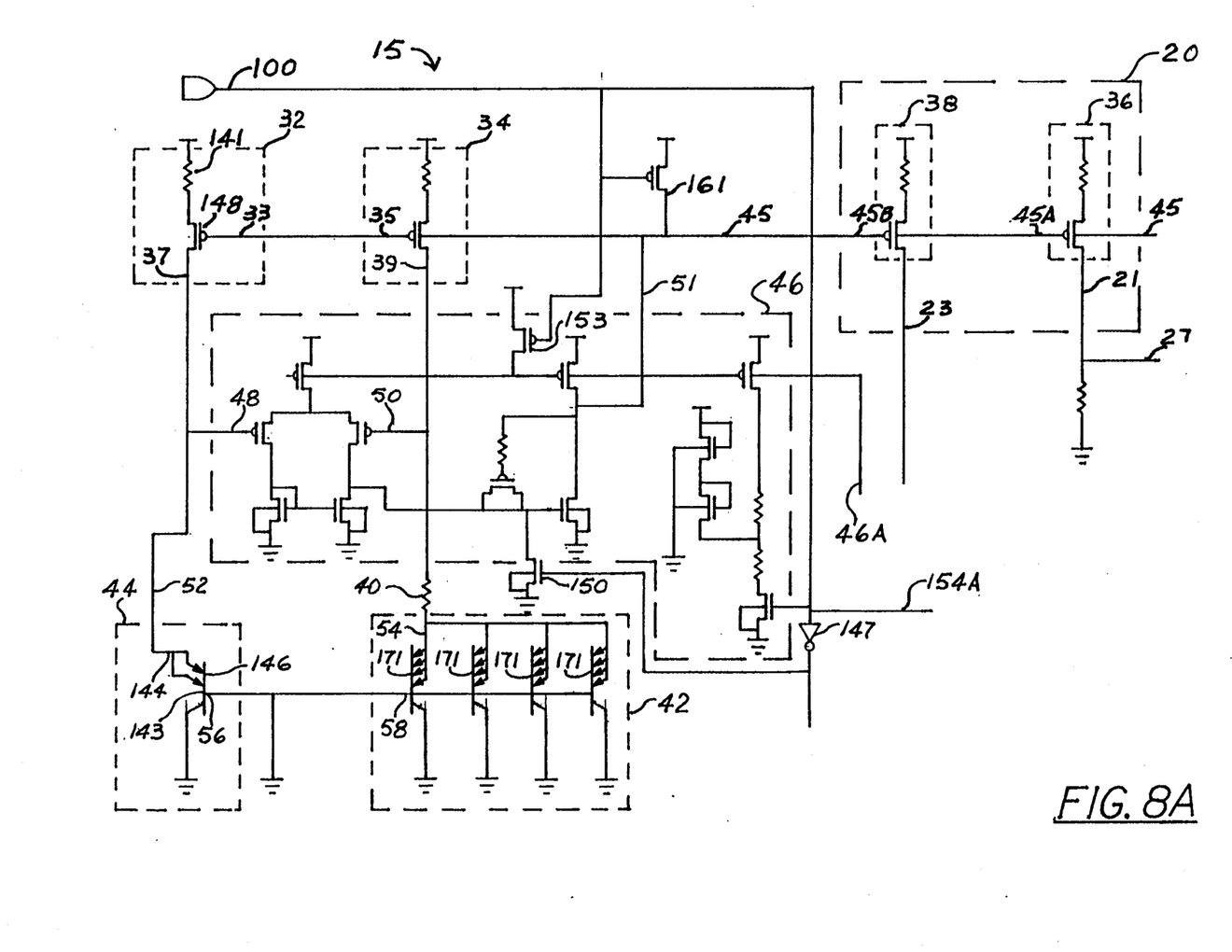
FIGS. 8a,b,c are detailed schematic diagrams of the preferred embodiment of the present invention.

FIGS. 8a,b,c show a preferred exemplary embodiment of the present invention. For ease of understanding, like components in FIGS. 8a,b,c and in FIGS. 2-3 have like reference numerals. The embodiment illustrated in FIGS. 8a,b,c are an apparatus 15 configured for implementation in a CMOS microprocessor (not shown). The detail provided with respect to current generator 32, current generator 34, amplifier 46, diode 44, diode 42, hysteresis circuit 26, control circuit 28, current generator 36, current generator 38, and constant signal source 24 is shown as a preferred exemplary embodiment, and the present invention is not limited to the specific embodiment shown in FIG. 8.

Figure 8B:
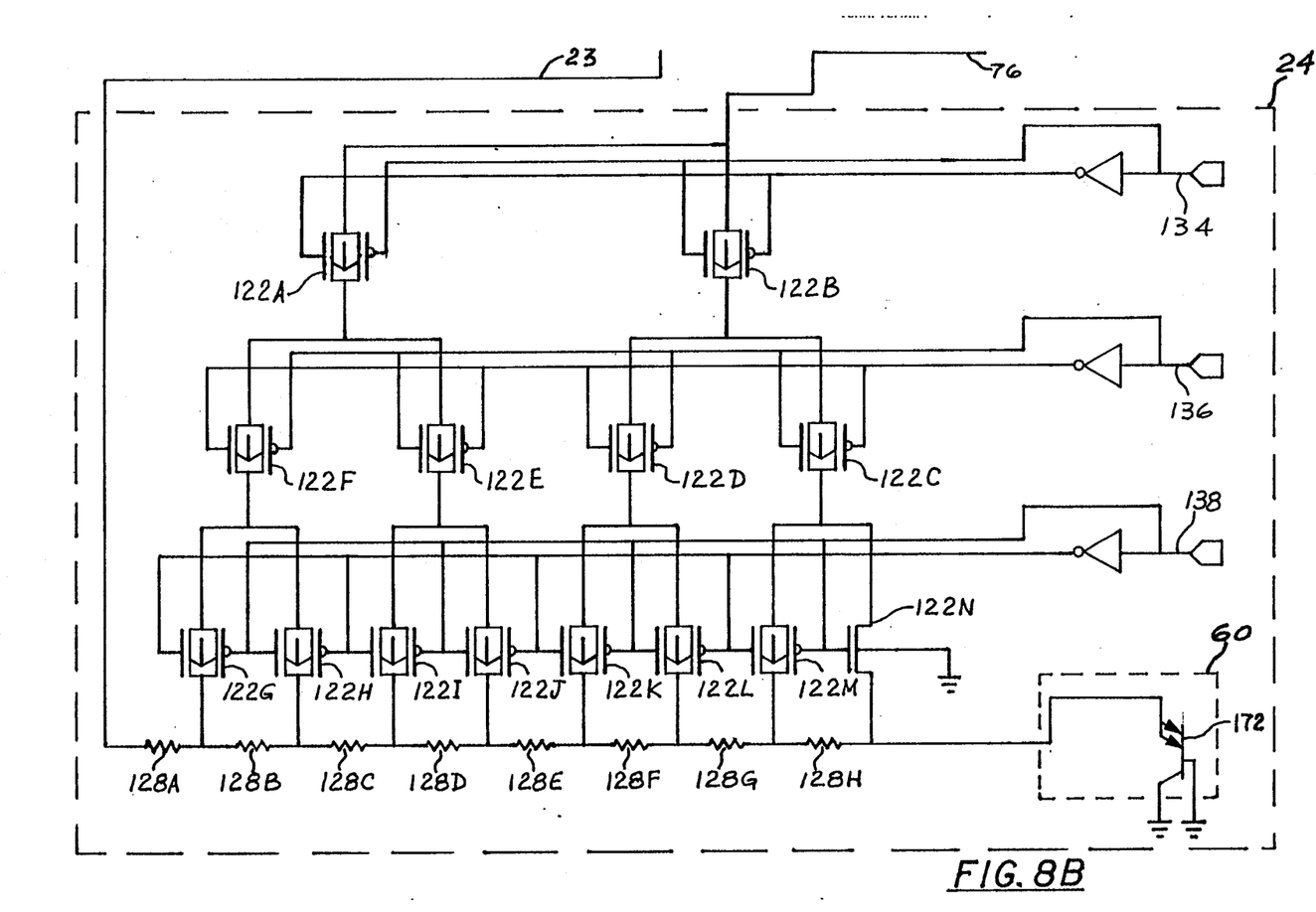
Figure 8C:
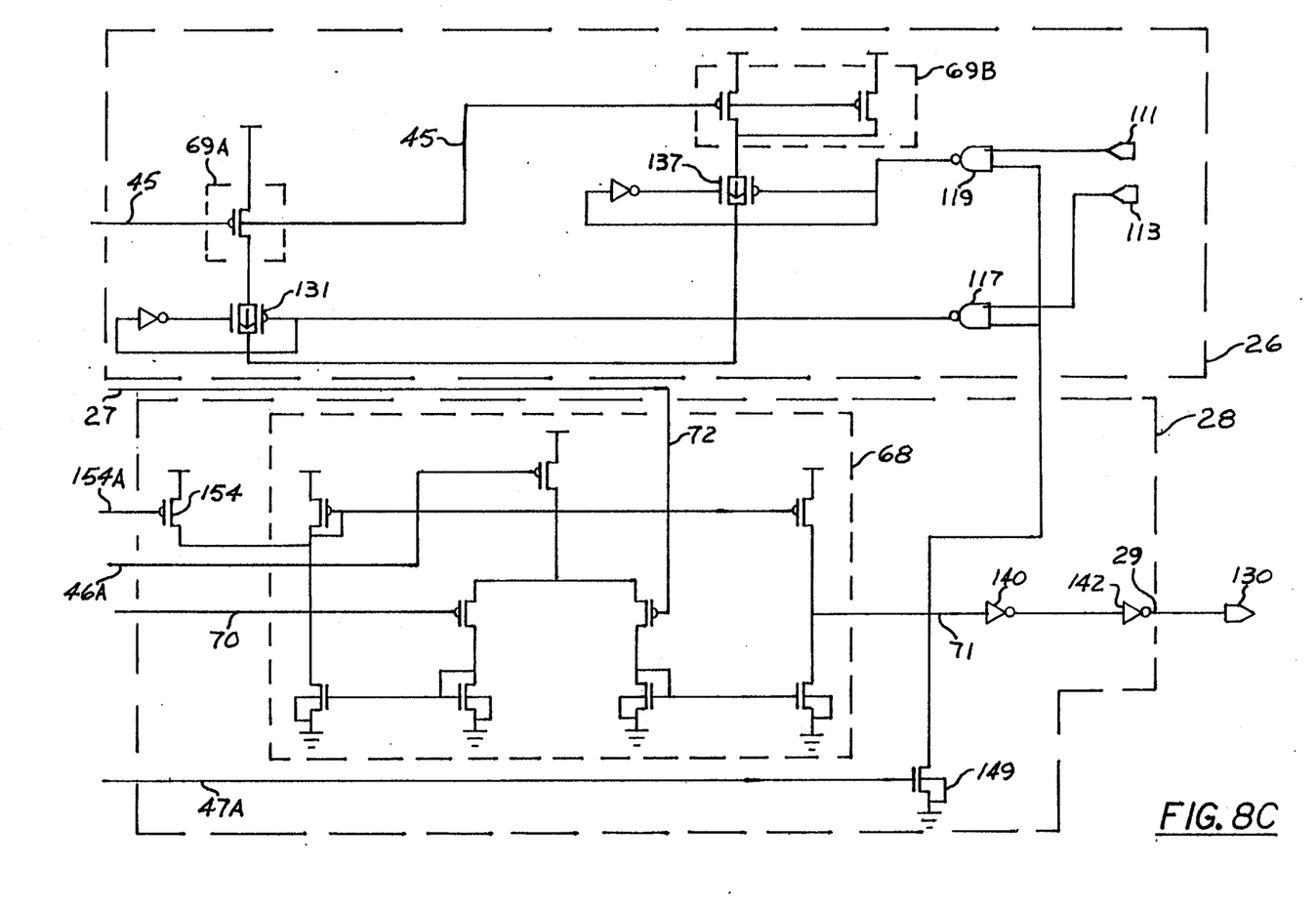

In FIGS. 8a,b,c, apparatus 15 is enabled at an enable input 100. Enable input 100 provides a signal which enables amplifier 46, current generators 32 and 34, current source 20, and comparator 68. An FET (Field Effect Transistor) 149, an FET 150, an FET 153, an FET 154, an FET 161, an FET 165, and an inverter 147 are operatively coupled to enable input 100 and comprise a circuit for enabling amplifier 46, current generators 32 and 34, current source 20, and comparator 68.

FET 149 and FET 150 enable amplifier 46 and comparator 68 in response to a signal from inverter 147 which is directly coupled to enable input 100. Also, FET 153 and FET 165 enable amplifier 46 in response to the signal at enable input 100. FET 154 enables comparator 68 in response to the signal at enable input 100. FET 161 is coupled to control link 45 to enable current source 20 and current generators 32 and 34 in response to the signal at enable input 100, as well as current sources 69A and 69B and amplifier 48, each of which are coupled to control link 45. Hence, components in apparatus 15 may be turned ON and OFF by the signal on enable input 100 for testing operations and power may be saved by disabling the components in apparatus 15 when apparatus 15 is not in use.

Current generators 32, 34, 36 and 38 are each preferably comprised of a resistor and an FET, similar to a resistor 141 and an FET 148 in current generator 32. Resistor 141 and FET 148 in current generator 32 provide a current source or one-half of a current mirror.

Diode 44 is preferably a bipolar transistor 143 having anode 52 at an emitter 144 and cathode 56 at a base 146. Similarly, diode 42 is comprised of a group of bipolar transistors 171, and diode 60 is a bipolar transistor 172. Bipolar transistors 143, 171 and 172 associated with diodes 42, 44 and 60 are laid out in a single group. Diodes 42, 44, and 60 may also be CMOS diodes.

Preferably, impedance circuit 22 is a resistor having a resistance value of 666.6 ohms. Preferably, the sum of resistance values associated with resistor 66 is 847.49 ohms.

Various resistance values are provided by resistor 66 by programming pass gates or transfer gates 122A–122N. Transfer gates 122A–122N are programmed by signals on program inputs 134, 136, and 138. Transfer gates 122A–122N, depending on the signals on program inputs 134, 136 or 138, provide paths through or around resistors 128A–F to provide various resistance values for resistor 66 so that a constant signal with respect to temperature is at constant signal source output 25 as discussed above with reference to FIGS. 3 and 4.

Similarly, hysteresis circuit 26 may be programmed by hysteresis program inputs 111 and 113. The control signal at control circuit output 71 and the program signal at hysteresis program input 113 control transfer gate 131. If the signal at hysteresis program input 113 and control circuit output 29 are both a logic HIGH, a NAND gate 117 provides a logic LOW to a transfer gate 131. Transfer gate 131 allows a current source 69A to provide current to impedance circuit 22 in response to the logic Low. If the signal at hysteresis program input 111 and the control signal at control circuit output 29 are both a logic HIGH, a NAND gate 119 turns ON a transfer gate 137 so that current from a current source 69B is provided to impedance circuit 22. Preferably, current source 69B provides more current than current source 69A. Logic HIGHs may be simultaneously provided at hysteresis program inputs 111 and 113. Thus, four levels of hysteresis may be provided by programming hysteresis inputs 111 and 113.

Comparator output 71 is coupled to pin 30 through buffering inverters 140 and 142. Inverter 142 provides the control signal at control circuit output 29 to pin 30.

It is understood that, while the detailed drawings and specific examples given describe a preferred exemplary embodiment of the present invention, they are for the purpose of illustration only. The apparatus of the invention is not limited to the precise details and conditions disclosed. For example, although the diodes are shown as having a 2 mV/° C. response, any temperature response may be appropriate. Also, several apparatuses may be combined to provide signals for various thresholds. Also, the device may be employed in any type of integrated circuit, although only a MOS integrated circuit is described. Further, single lines in the various figures may represent multiple conductors. Various changes may be made to the details disclosed without departing from the spirit of the invention which is defined by the following claims.

What is claimed is:

1. A monolithic integrated circuit microprocessor, comprising:
   a clock driver;
   a thermal sensor integrated adjacent the clock driver, the thermal sensor providing an output signal, said output signal being related to temperature within said microprocessor; and
   a control circuit having a control input, said control input being operatively coupled with said thermal sensor to receive said output signal, said control circuit generating a thermal detect signal in response to said output signal, said detect signal being generated when said output signal is in a predetermined relationship with a threshold.

2. The microprocessor of claim 1, wherein the thermal sensor is physically in contact with said clock driver.

3. The microprocessor of claim 1, wherein the thermal sensor further comprises a plurality of diodes.

4. The microprocessor of claim 3, wherein the control circuit is a comparator having a first input coupled to a constant signal source, and a second input coupled to said control input.

5. The microprocessor of claim 4 wherein said microprocessor is a MOS device.

6. An apparatus for providing an indicator signal in response to temperature in an integrated circuit, the apparatus being integrated within the integrated circuit and comprising:

threshold means for providing a threshold signal;

thermal sensing means for generating a temperature signal related to said temperature, said thermal sensing means including a plurality of temperature sensitive devices coupled to generate a thermal signal, said plurality of temperature sensitive devices including like parameters, said thermal signal related to said temperature and a factor, said factor being related to a ratio of said like parameters, said thermal sensing means generating said temperature signal in response to said thermal signal; and indicator means for providing said indicator signal, said indicator means having a first indicator input and a second indicator input, said first indicator input being coupled with said thermal sensing means to receive said temperature signal, said second indicator input being coupled with said threshold means to receive said threshold signal, said indicator means providing said indicator signal when said temperature signal is in a predetermined relationship with said threshold signal.

7. An apparatus for providing an indicator signal in response to temperature as recited in claim 6, wherein a threshold signal is constant with respect to changes in said temperature.

8. An apparatus for providing an indicator signal as recited in claim 6, wherein said thermal sensing devices are diodes and said like parameters are areas of said diodes.

9. An apparatus for providing an indicator signal as recited in claim 8, wherein the integrated circuit is a CMOS device.

10. An apparatus for providing an indicator signal as recited in claim 6, further comprising:

a hysteresis means for providing hysteresis, said hysteresis means having a hysteresis input and a hysteresis output, said hysteresis input being coupled with said indicator means to receive said indicator signal, said hysteresis output being coupled with said first indicator input, said hysteresis means adjusting said temperature signal in response to said indicator signal.

11. An apparatus for providing an indicator signal as recited in claim 10, wherein said hysteresis means is programmable to adjust said temperature signal by one of a plurality of hysteresis factors.

12. An apparatus for providing a control signal in response to temperature, the apparatus comprising:

a current source means for providing a current source signal;

a current source control means for controlling said current source means, said current source control means being responsive to said temperature, said current source means cooperating with said current source control means to generate said current source signal, said current source signal being related to said temperature;

control means for providing said control signal, said control means receiving a first input and a second input, said control means providing said control signal when said second input is in a predetermined relationship with said first input;

first impedance means for providing said first input, said first impedance means being coupled with said current source means, said first impedance means receiving said current source signal and generating said first input in response to said current source signal; and second impedance means for providing said second input, said second impedance means being coupled with said current source means, said second impedance means receiving said current source signal and generating said second input in response to said current source signal, said second input being relatively constant with respect to changes in said current source signal.

13. An apparatus for providing a control signal as recited in claim 12, wherein said current source means includes a plurality of current mirrors providing said current source signal at a plurality of outputs.

14. An apparatus for providing a control signal as recited in claim 12, wherein said current source control means includes diodes coupled in parallel and a current mirror, said plurality of diodes drawing current from said current mirror, said diodes drawing said current in a temperature dependent response.

15. An apparatus for providing a control signal as recited in claim 14, wherein said current mirror includes a current mirror control input, and wherein said current source control means includes an operational amplifier coupled to said diodes, said operational amplifier having an amplifier output, said amplifier output being coupled to said current mirror control input.

16. An apparatus for providing a control signal as recited in claim 12, wherein said second impedance means includes a resistor and a diode coupled in series.

17. An apparatus for providing a control signal as recited in claim 16, wherein said resistor is programmable.

18. An apparatus for providing a control signal as recited in claim 17, wherein said resistor is adjusted so that a voltage drop across said resistor has an inverse response to the response of said diode.

19. An apparatus for providing a control signal as recited in claim 18, wherein the apparatus is integrated within a microprocessor.

20. An apparatus for providing a control signal as recited in claim 12, wherein the apparatus is integrated proximate clock driver circuitry.

21. An apparatus for generating a control signal in response to temperature, the apparatus comprising:

a first current generator having a first control input and a first output;

a second current generator having a second control input and a second output;

a third current generator having a third control input and a third output, said first control input being coupled to said second control input and said third control input, said third output providing a current signal;

a first diode coupled with the first output;

a second diode coupled with said second output;

an impedance device coupled with said third output, said impedance device generating a temperature signal in response to said current signal; and a control circuit having a first input coupled with said impedance device, said control circuit receiving said temperature signal, said control circuit providing said control signal when said temperature signal is in a predetermined relationship with a predetermined threshold.

22. An apparatus for generating a control signal as recited in claim 21, further comprising:
 a fourth current generator having a fourth control input, and a fourth output, said fourth control input coupled with said first control input; and
 a third diode, said third diode coupled with said fourth output, said third diode providing a constant signal representing said predetermined threshold, said constant signal remaining constant with respect to changes in said temperature.

23. An apparatus for generating a control signal as recited in claim 19, further comprising:
 an insurance circuit having a first insurance input coupled to said first output, a second insurance input coupled to said second output, and an insurance output coupled to said first control input.

24. An apparatus for generating a control signal as recited in claim 23, further wherein said insurance circuit is an operational amplifier.

25. An apparatus for generating a control signal as recited in claim 19, further comprising a hysteresis circuit coupled to said control circuit, said hysteresis circuit providing hysteresis to reduce ON/OFF exercising of said control signal.

26. An apparatus for generating a control signal as recited in claim 25, wherein said hysteresis circuit includes a hysteresis input coupled to receive said control signal, and a hysteresis output coupled to said impedance device, said hysteresis circuit increasing said temperature signal in response to said control signal.

27. An apparatus for generating a control signal as recited in claim 25 wherein said hysteresis circuit is programmable to provide at least one of a plurality of levels of hysteresis.

28. An apparatus for generating a control signal as recited in claim 25 wherein said hysteresis circuit includes at least one current source.

* * * * *